United States Patent
Paul et al.

(10) Patent No.: US 6,850,758 B1
(45) Date of Patent: Feb. 1, 2005

(54) METHOD AND SYSTEM FOR INTEGRATING FIXED TERMINALS IN A MOBILE TELECOMMUNICATION NETWORK

(75) Inventors: Fritz R. Paul, Eriskirch (DE); Frank Billenkamp, Markdorf (DE); Ross A. Carevic, Farnham Common (GB)

(73) Assignee: Nortel Networks Limited, St. Laurent ( * ) Notice: Subject to any disclaimer, the term of this patent is extended or adjusted under 35 U.S.C. 154(b) by 736 days.

(21) Appl. No.: 09/724,322

(22) Filed: Nov. 28, 2000

(51) Int. Cl.[7] ................................................. H04Q 7/20
(52) U.S. Cl. ............................ 455/422.1; 455/426.2; 455/432.3; 455/435.1; 455/426.1
(58) Field of Search .......................... 455/414.1, 426.1, 455/426.2, 432.3, 435.1, 445, 552.1, 554.1, 422.1, 433, 517

(56) References Cited

U.S. PATENT DOCUMENTS

| | | | |
|---|---|---|---|
| 5,742,905 A | * 4/1998 | Pepe et al. | 455/461 |
| 5,787,343 A | * 7/1998 | Iijima et al. | 455/426.2 |
| 5,845,211 A | * 12/1998 | Roach, Jr. | 455/436 |
| 5,890,064 A | * 3/1999 | Widergen et al. | 455/445 |
| 5,953,651 A | * 9/1999 | Lu et al. | 455/408 |
| 6,181,935 B1 | * 1/2001 | Gossman et al. | 455/433 |
| 6,259,782 B1 | * 7/2001 | Gallant | 379/211.01 |
| 6,324,402 B1 | * 11/2001 | Waugh et al. | 455/445 |
| 6,473,626 B1 | * 10/2002 | Nevoux et al. | 455/560 |
| 6,618,588 B1 | * 9/2003 | Easley | 455/433 |

FOREIGN PATENT DOCUMENTS

| | | |
|---|---|---|
| EP | 0 779 757 A2 | 12/1995 |
| EP | 0 923 258 A2 | 6/1998 |

* cited by examiner

*Primary Examiner*—Simon Nguyen
(74) *Attorney, Agent, or Firm*—Barnes & Thornburg LLP

(57) ABSTRACT

A method for integrating fixed terminals in a mobile telecommunications network capable of handling calls to and from registered subscribers, comprising the steps of:

connecting the fixed terminals through fixed lines to an interface unit for the mobile network;

providing a register for storing, for each subscriber, subscriber information by which the subscriber is addressable;

storing, as part of the subscriber information, access information specifying one or more predefined access types, that are available for that subscriber, and specifying whether or not the subscriber has multiple access to the network; and controlling the call handling on the basis of the stored access information.

18 Claims, 4 Drawing Sheets

```
{FIX_LINES}
   Access_Type [analog, BRI primary, BRI secondary, mobile]
      {analog}
         optional mobile_IMSI vector of 15 [0-9]s
      {primary}
         Access_Sub_Type [p2m, p2p]
         {p2m}
            vector of up to 3 multiples with
               DN1_CFD_Type [unconditional, busy, no_reply]
               DN1_ISDN_Basic_Service_Id [0..64]
               DN1_CFD_DN vector of up to 15 [0-9]s
            MSN vector of up to 11 [0-9]s
               vector of up to 3 multiples with
                  CFD_Type [unconditional, busy, no_reply]
                  ISDN_Basic_Service_Id [0..64]
                  CFD_DN vector of up to 15 [0-9]s
            vector of up to 8 multiples with
               MSN vector of up to 11 [0-9]s
                  vector of up to 3 multiples with
                     CFD_Type [unconditional, busy, no_reply]
                     ISDN_Basic_Service_Id [0..64]
                     CFD_DN vector of up to 15 [0-9]s
         {p2p}
            Base_SN  vector of up to 11 [0-9]s
            Range    [(10), (100), (1000), (10000)]
            Term_on_0 [yes, no]
            vector of up to 10 multiples with
               EXT vector of up to 4 [0-9]s
               EXT_DN vector of up to 15 [0-9]s
      {secondary}
         Default_IMSI_MSIN vector of 10 [0-9]s
         optional mobile_IMSI vector of 15 [0-9]s
      {mobile}
         Default_IMSI vector of 15 [0-9]s
```

METHOD AND SYSTEM FOR INTEGRATING FIXED TERMINALS IN A MOBILE TELECOMMUNICATION NETWORK

BACKGROUND OF THE INVENTION

The invention relates to a telecommunication system which integrates a mobile network with a wireline network.

In a conventional wireline network, for example one of the type which is known as the "Plain Old Telephone System" (POTS), subscribers are provided with a directory number for a location in the system i.e. an access point where a fixed terminal of the subscriber is connected to the system, and calls are switched through to the location indicated by the directory number. Customer services, billing procedures and enhanced services to which the user has subscribed are organized on the basis of the principle that the service is tied to the fixed access point.

In contrast, a mobile network has to be organized in view of the fact that access is not a through fixed access point but through mobile terminals. As a consequence, services are stored and provisioned on a single node in the netwsork and distributed on an "as needed" basis. The subscriber is identified by a unique and permanent identifier, for example by the "International Mobile Subscriber Identity (IMSI) in accordance with existing international standards. This identifier may for example be stored in a memory which is part of the mobile device itself or in a separate insertable memory module, for instance a Subscriber Identity Module (SIM) in an integrated chip card as is known from the European GSM mobile telecommunication system. Communication between the mobile device and the stationary part of the network is achieved through an air link, i.e. by radio transmission. Radio transmission system protocols are used to identify the subscriber from the information encoded on the SIM card. Services which the user has subscribed to can be derived from the same provisioning node. They are linked against the subscriber ID that is also stored on the SIM card.

In a cellular mobile network such as GSM, the air link connects the mobile device to one of a plurality of stationary transceivers each of which provides radio coverage for a certain area (cell). The transceivers are interconnected by the mobile network which may be in the form of a packet network or in the form of a switched node type network as in GSM. The following description will refer to the GSM system as a typical example of a prior art mobile network.

Typically, a plurality of transceivers are controlled by a node which is called Mobile Services Switching Center (MSC). The MSCs can communicate with each other and with a central register which is called "Home Location Register" (HLR). This HLR stores the subscriber Identifiers (IMSIs) of all subscribers along with location information and additional information which is needed among others for identifying the services to which the user has subscribed. Associated with each node (MSC) is a so-called Visitor Location Register (VLR) which stores the necessary data from the Home Location Register (HLR), but only for those subscriber identifiers (IMSIs) of the mobile devices that are presently "visiting" the area of radio coverage controlled by the MSC. When the mobile device enters into the area of radio coverage of another MSC, this has to be signaled to the Home Location Register (HLR), and a copy of the data file pertaining to this device is transferred into the Visitor Location Register (VLR) associated with the new MSC. Thus, the HLR can keep track of the location of all mobile devices. In a call setup procedure, the HLR is queried by a Gateway MSC (GMSC) of the operator's network as to the current location of the called mobile device, and the HLR returns a "Mobile Subscriber Roaming Number" (MSRN) under which the called device can currently be reached. This MSRN is temporarily assigned to the called device by the MSC (terminating MSC) which is at that time visited by the called device. Then, the MSC that is in charge of the calling party (originating MSC) uses the MSRN for directly contacting the terminating MSC.

A mobile network is typically linked to other networks. e.g. to a Public Switched Telephone Network (PSTN), by mans of a gateway, e.g. a gateway MSC (GMSC), so that it is possible to make a call from the mobile network into the PSTN and vice versa. On the other hand, a mobile subscriber will normally have direct access to a PSTN through a fixed terminal, e.g. an analog telephone or an ISDN Basic Rate Interface (BRI). This co-existence of mobile networks and wireline networks has several drawbacks. From the viewpoint of the user, a main drawback is that he has to subscribe to two different networks, one mobile network and one wireline network. In addition to increased costs, this involves the inconvenience that the user has to cope with different sets of services offered by the operators of the two networks, and the service profiles to which the user has subscribed in the two networks will generally not be consistent with each other. From the viewpoint of the operator, a main drawback can be seen in the necessity to establish and run two separate networks, a mobile network and a wireline network, in order to provide full service to the customers. Although many services will be similar or even identical in the mobile network and in the wireline network, these services must be developed and implemented separately in the two networks. It would therefore be desirable to provide for more "convergence" between the two types of telecommunication networks and, ideally, to integrate mobile network facilities and wireline network facilities into a single network which is organized under a unique scheme and includes service facilities that may be used in common for the mobile part and the fixed line part of the system.

One approach to integrate fixed wireline networks and mobile networks is based upon an Intelligent Network (IN) system that is provided "on top" of the two networks. Then, if a subscriber wants to have one common directory number (DN), an identical service set and a consistent service profile for both networks, all services including the DNs have to be under control of the IN system. The underlying fixed and mobile networks are just used as vehicles to get the data to and from the IN system. This, however, has the drawback that the operator still has to manage two different networks and, in addition, the IN system, which leads to increased costs. Moreover, the expensive available service infrastructure present in the fixed and mobile networks is only partially used. Although it would be possible to convert services offered in the underlying fixed and mobile networks to the IN system, this solution is in most cases not practicable for cost reasons.

Another approach which achieves, to a certain extent, an integration of fixed lines into a mobile network, has been described in EP-A-0 779 757. Here, the fixed terminals are connected through fixed lines to an interface unit which, from the perspective of the MSC, behaves like a transceiver or like a so-called Base Station Subsystem (BSS) controlling one or more transceivers. The subscriber identifiers for the fixed line subscribers are encoded on SIM cards just as the identifiers for mobile subscribers, and these SIM cards are inserted in the fixed terminal devices. As a consequence, the fixed terminal devices must be equipped with a card reader in order to be able to connect the mobile network. The main disadvantage of this approach is that non-standard fixed line signalling has to be used.

EP-A-0 923 258 describes a similar solution which is also based on the use of an interface unit which is called a "Fixed Access Controller" (FAC). This FAC may be integrated in the mobile access node MSC or may be incorporated in the system somewhere between the MSC and the fixed terminals. The necessity to physically provide SIM-cards and SIM-card readers in the fixed terminal devices is avoided by employing so-called virtual SIMs (VSIMs) which may be implemented in the fixed access controller FAC.

In this known system, specific measures are described for fully exploiting the larger bandwidth of fixed lines in comparison to wireless connections. Since the air link represents a bandwidth bottleneck, the communication among the various MSCs occurs at a higher transmission rate (e.g. 64 kB/s) than the communication over the air link (e.g. at 16 kB/s), and the system includes certain interworking functionality for compression of voice data and for adapting the transmission rates. This interworking functionality may be implemented in the MSC or somewhere downstream towards the air link. If non-voice data (e.g. fax) are to be transmitted to a fixed line access, this interworking functionality is not needed and is even undesirable in view of the achievable transmission rate. This is why the known system provides means for bypassing the interworking functionality in case of (non-voice) data calls.

Since the mobile network and the wireline network use different signaling protocols, the interface unit, e.g. the FAC, has to provide for protocol conversion. On the other hand, since the administration system of the mobile network treats the fixed access subscribers (represented by the virtual SIMs) as if they were mobile subscribers, the messages from the mobile network to the fixed terminal or vice versa, or at least portions of these messages, should be transmitted transparently through the wireline network.

In some of the embodiments disclosed in EP-A-0 923 258 this is achieved by providing a first interface unit between the mobile network and the wireline network and a second interface unit between the wireline network and the fixed terminal. Then, messages from the mobile network to the fixed terminal are encapsulated in the first interface unit and, conversely, messages from the fixed terminal to the mobile network are encapsulated in the second interface unit. If the wireline network is a Public Switched Telephone Network (PSTN), each of the two interface units will have a directory number within the PSTN system. However, these directory numbers are "invisible" for the mobile network, i.e. they are not stored in the Home Location Register (HLR) of the mobile network.

In another embodiment, the fixed access terminal is an ISDN telephone, and interfacing to the mobile network is achieved by means of a converter which may be owned or rent by the fixed access subscriber and which emulates all the functions of a mobile transceiving device and terminates all mobile network signaling (e.g. DTAP signaling) from the MSC and converts it to ISDN Q931 signaling for the subscriber's terminal equipment. Since an ISDN basic rate interface comprises two traffic channels, the converter stores two different subscriber Identifiers (IMSIs), one for each channel. These IMSIs are also stored in the HLR of the GSM mobile network, and they are treated there like IMSIs of two (different) mobile subscribers. The HLR does not "know" the ISDN directory number assigned to this access.

Since, in these known systems, the HLR or, more generally, the administration system of the mobile network does not distinguish between a true mobile access and a virtual mobile access which in fact represents a fixed line access, the mobile network is not capable of providing all the services that are commonly provided in a wireline network, and integration of lines and services can only be achieved to a limited extent. Moreover, provisioning of lines and services for the fixed line subscribers is effected mainly on the level of the MSCs or lower, i.e. in a decentralized way. This has the drawback that provisioning of fixed line access to the mobile network is difficult to manage, and when a user has subscribed to both a mobile access and a fixed line access, consistency of the respective service profiles cannot be guaranteed.

SUMMARY OF THE INVENTION

It is a general object of the invention to provide for more convergence between mobile and wireline telecommunications networks. A more specific object of the invention is to provide a manageable way for provisioning lines and services for a fixed line subscriber to a mobile network.

According to the invention, there is provided a method for integrating fixed terminals in a mobile telecommunications network capable of handling calls to and from registered subscribers, comprising the steps of:

connecting the fixed terminals through fixed lines to an interface unit for the mobile network;

providing a register for storing, for each subscriber, subscriber information by which the subscriber is addressable;

storing, as part of the subscriber information, access information specifying one or more predefined access types, fixed or mobile, that are available for that subscriber, and specifying whether or not the subscriber has multiple access to the network; and controlling the call handling on the basis of the stored access information.

Since the type of access used by a subscriber is stored centrally in the register of the mobile network, e.g. the Home Location Register (HLR) of a GSM network, the administration system of the mobile network is enabled to provide access type-specific services. Another important advantage of the invention is that lines and services can be provisioned easily and consistently by reference to the register. If a subscriber has multiple access to the network, e.g. through one mobile and one fixed terminal or through the two channels of an ISDN Basic Rate Interface (BRI), this is indicated by the access information, and the accesses belonging to the same subscriber can be linked together for service profile consistency and for appropriate call handling, including the possibility to multiply calls that are terminating to a multiple access.

If, for example, a user has subscribed to a fixed line access and also to a mobile access, it is possible to have one and the same directory number for both accesses. Thus, when the unique directory number is dialed, a query to the register reveals that the subscriber has multiple access, and the call will be offered to both accesses. As a result, the mobile telephone and the fixed line telephone of the subscriber will ring simultaneously.

This implements the concept "one operator, one number". The single number doesn't have to be a "Mobile Subscriber ISDN Number" (MSISDN) of the type that is normally assigned within a mobile network, but it may be a number from a national numbering plan of a PSTN or of any other wireline network. This is particularly attractive because a customer who plans to subscribe to a mobile network typically possesses already a directory number for a wireline network, which in most case will be run another operator. Then, when the customer contracts with the operator of the integrated fixed/mobile network according to the invention. he may retain his old telephone number and may use it not only for the fixed access but also for his mobile phone.

It is one of the remarkable advantages of the invention that the functionality of the mobile network can be enhanced for integrating fixed lines or wireline networks within the framework of existing and well established standard protocols. This holds true not only for the GSM system but also for other types of mobile telecommunication networks such as Intelligent Networks (IN), UMTS networks and the like.

The changes that have to be made in an existing mobile network are essentially limited to adding a new data structure for the access type information in the register and to minor modifications in the software controlling the signaling according to the standard protocols (e.g. the software implemented in the MSCs of the GSM system). Once these changes have been made, new fixed line accesses can be provisioned upon demand, simply by connecting additional fixed lines to the interface unit and by entering the pertinent data into the register.

The invention further provides a telecommunications network including a mobile network and fixed lines connecting fixed terminals to the mobile network through an interface unit, the network comprising a register storing subscriber information for each subscriber to the network, wherein the subscriber information includes access information specifying one or more predefined access types, fixed or mobile, that are available for that subscriber, and specifying whether or not the subscriber has multiple access to the network.

Embodiments of the invention may include one or more of the features described below, which are useful for dealing with more specific problems in the context of fixed/mobile convergence.

In a preferred embodiment the register is in the form of a database in which each access is represented by an identifier and the associated subscriber information, and the access type information includes a reference to another identifier which represents another access of the same subscriber.

The references to other identifiers for the same subscriber may be used for linking together the identifiers and hence the accesses belonging to the same subscriber. Then, it may be specified that the service profiles associated with the various identifiers are linked together in a master/slave relationship, which means that the service profile that has been set up for the master shall also be valid for the slave or slaves. This assures consistency between the service profiles in accordance with the concept "one operator, one profile". Of course, this concept is subject to certain limitations as far as services are concerned that are possible only within the mobile network or only within the wireline network. Since the access type is available in the register, the necessary restrictions to the service profile can be made automatically.

The integration of services achieved by this feature has the advantageous effect that one and the same service, a voice mail service for example, is available regardless of whether access is made from a mobile terminal or a fixed terminal.

More specific features of the invention will be exemplified below under the assumption that the mobile network is a GSM network and the fixed line access is an ISDN Basic Rate Interface (BRI). It will be understood however that these features may easily be adapted to other network environments.

In order to support overlap dialing for calls terminating to a fixed access, it is preferable that the switch (MSC) associated with the fixed access controller (FAC) is a Gateway MSC (GMSC), i.e. a switch which is capable of routing calls to and from a PSTN. While mobile telephones can only send directory numbers for a call origination en-bloc, analog fixed lines only can send them overlapped, digit for digit. If there is a fixed dialing plan, this is not a problem, because, then, the total number of digits is known, and the originating switch can collect these digits and issue an en-block origination when the last digit has been received.

In case of an open dialing plan, however, only the terminating switch of a call can decide that all digits have been dialed. The originating switch therefore has to forward digits of the call origination as soon as it can decide its terminating route. Further incoming digits are sent overlapped, digit per digit, to the terminating switch. Since line provisioning is effected in the home location register (HLR), queries to the HLR would have to be repeated for each new incoming digit, and this would impose an unacceptable load on the HLR. However, when the terminating MSC controlling the fixed lines is a Gateway MSC, it is possible to check the validity of the dialed number in the GMSC and to issue an en-block query to the HLR.

For an ISDN BRI access, it is preferable that the two identifiers (IMSIs) associated with the two BRI channels are linked together in the HLR. Then, a call terminating to the BRI can be offered to both channels, and two active calls on the same access can be supported.

In a BRI access, a distinction has to be made between two access sub-types: "point to point" and "point to multiple". Point to point lines usually serve small private branch exchanges (PBX). There is one base directory number, and after that base directory number the point to point access controls its own range of directory numbers for direct dialing (DDI). This range is decimal, so that there may be a range of 10, 100, 1000, etc. Since overlap dialing is supported, the user may specify by an appropriate entry in the access type information whether or not the call shall terminate directly if the first extension digit is "0".

One of the most important services available in a point to multipoint-type BRI is the Multiple Subscriber Number (MSN). This means that a plurality of directory numbers is provided for the access, and it is left to the discretion of the user which directory numbers shall be used for which purpose. Preferably, this service is also supported in the integrated network according to the invention.

Preferably, the system also supports functions like Call Waiting, Call Hold and Call Forwarding. This is possible even in case of point to multipoint termination, because an incoming call can be offered to both IMSIs of the line, as has been explained above.

BRIEF DESCRIPTION OF THE DRAWINGS

A preferred embodiment of the invention will now be explained in conjunction with the accompanying drawings, in which:

FIG. 3 is a data structure included in the subscriber information in the register;

DESCRIPTION OF THE PREFERRED EMBODIMENTS

An embodiment of the invention will now be described, taking the European GSM system as an example for a mobile network, although the invention is not limited thereto.

Figure 1:
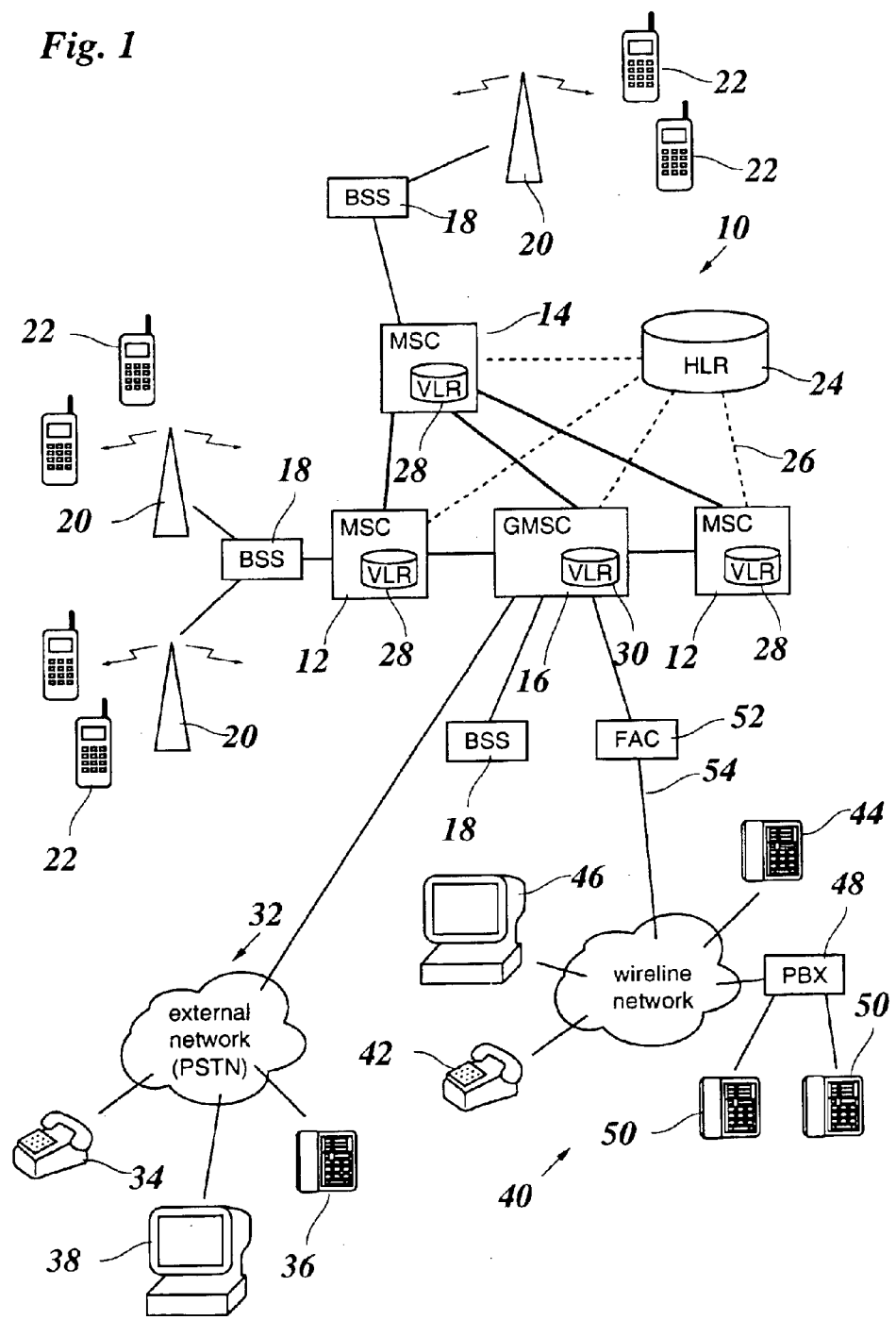
FIG. 1 is a block diagram of an integrated fixed/mobile telecommunications network.

FIG. 1 shows the mobile network 10 having a switched access node architecture. The access nodes are formed by Mobile Services Switching Centers (MSCs) 12 or a Gateway MSCs (GMSC) 16. The MSCs and GMSCs are fully interconnected, and each of them controls one or more Base Station Subsystems (BSS) 18. Each BSS controls one or more base stations or transceivers 20 communicating through an air link, i.e. through radio waves, with mobile terminals 22 that are present in their area of radio coverage.

Each of the MSCs 12 and GMSCs 16 is further connected to a Home Location Register (HLR) 24 through signal lines 26. Subscriber information for all the subscribers to the network 10 is stored in the form of a database in the HLR 24. The subscriber information includes an identifier, i.e. a so-called International Mobile Subscriber Identity (IMSI), a directory number. e.g. a Mobile Subscriber ISDN number (MSISDN), by which the subscriber is addressable, location information indicating where the terminating mobile terminal 22 of a call is presently located, and additional subscriber information including specifications of the service profile to which the subscriber is entitled.

Each MSC and the GMSC include a Visitor Location Register (VLR) 28, 30 which stores copies of the data files from the HLR for those subscribers who are presently roaming in the area of radio coverage of the associated MSC or GMSC. When a mobile subscriber roams into a radio coverage area or cell controlled by another MSC, the location information in the HLR and the files in the concerned MSCs have to be updated in a procedure called Location Update.

GMSC 16 serves as a gateway to a wireline network, e.g. a Public Switched Telephone Network (PSTN) 32 which will usually run by a different operator and which connects analog telephones 34, ISDN telephones 36, computer terminals 38, and the like. Although it is possible to route calls from the PSTN 32 to the mobile network 10 vice versa through the GMSC 16, these two networks are not integrated in the sense that services and/or directory numbers are shared among the two networks.

FIG. 1 shows another wireline network 40 which, in contrast to the PSTN 32, is integrated with the mobile network 10. The wireline network 40 connects to fixed terminals which may include analog telephones 42, ISDN telephones 44 computer terminals 46, and the like. A fixed terminal may also be formed by a Private Branch exchange (PBX) 48 which branches to several terminal endpoints 50.

The wireline network 40 is connected to the mobile network 10 through an interface unit which is termed "Fixed Access Controller" (FAC) 52. FAC 52 is connected to the Gateway MSC 16. In the shown embodiment, the FAC 52 is on the same hierarchic level as a BSS 18 serving a number of mobile terminals 22, and both, BSS and FAC are connected to the GMSC 16 through A-Interfaces. FAC 52 may emulate a BSS, so that it may be handled by the GMSC 16 essentially like a "normal" BSS, although it terminates to fixed accesses. A single FAC may serve several GMSCs.

If interworking functionality for adapting the transmission rate to the lower capacity of the air link is implemented in the BSS 18, this functionality may be omitted in the FAC 52, because the fixed lines of the wireline network 40 allow for a higher transmission rate. If the interworking functionality is implemented in the GMSC 16, then means are provided for bypassing this functionality in case of non-voice calls terminating to the wireline network 40.

Since the fixed lines of the wireline network 40 are less vulnerable to illegal interception than the air links to the mobile terminals, the functionality that is normally implemented in a mobile network for encryption of data, authentication of subscribers and other security measures may be simplified for the FAC branch. For example, authentication codes used in a mobile system are changed dynamically for security reasons, so that each code is useable only for a certain time and then becomes "dirty". By allowing the use of such dirty authentication codes in the FAC branch, processing time can be saved.

The wireline network 40 may simply consist of fixed lines 54 which connect the fixed terminals to the FAC 52 either directly or through the intermediate of peripherals. The fixed lines 54 and the peripherals may be owned by the operator of the mobile network 10 or may be rent from the operator of another network. Whereas a BSS serves only a restricted local area, it will be understood that the fixed terminals connected to the FAC 52 are not restricted to a certain area. For example, the wireline network may include peripherals that are located hundreds of miles away from the FAC 52.

In a modified embodiment, the wireline network 40 may also be a switched network, e.g. a PSTN, through which messages between the FAC and the fixed terminals are transmitted transparently. In this case, it may however be necessary that the subscriber rents or buys additional equipment, e.g. a SIM card reader or the like, for getting access to the mobile network.

When, in the shown embodiment, a new fixed terminal is to be integrated into the mobile network 10, this terminal has to be connected physically, by a new fixed line 54, to a free port of the FAC 52. It may be assumed that virtual SIMs for this port have been implemented beforehand in the FAC and that corresponding blank files are provided in the HLR 24. Thus, it is sufficient to enter the subscriber-specific data in the blank files in the HLR. A copy of these data is transferred into the VLR 30. This transfer is triggered by a Location Update which is issued automatically by the FAC when a subscribed line goes into service. The new subscriber may then be treated as a (permanent) "visitor" to the GMSC 16.

Figure 2:
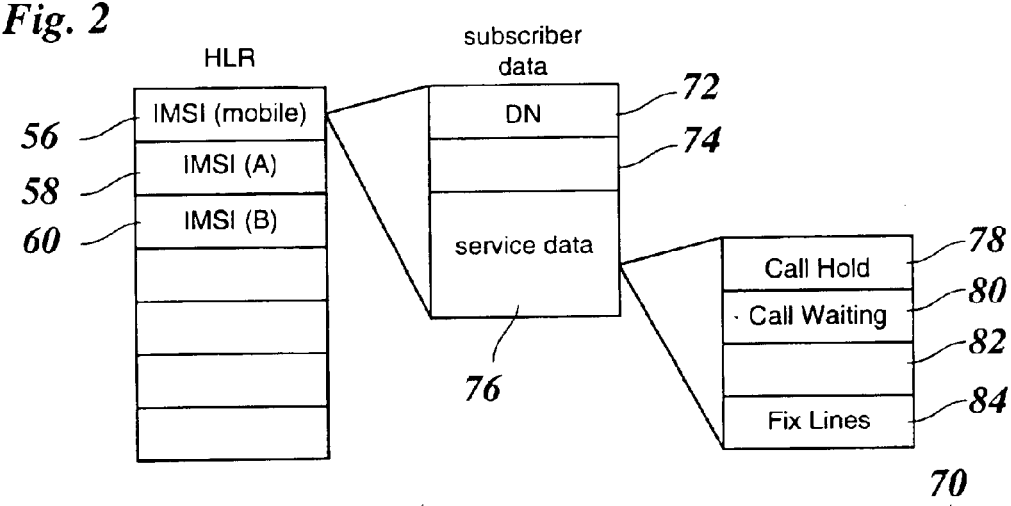
FIG. 2 illustrates the contents of a register administering subscriber information for the subscribers to the network shown in FIG. 1.
Figure 4:
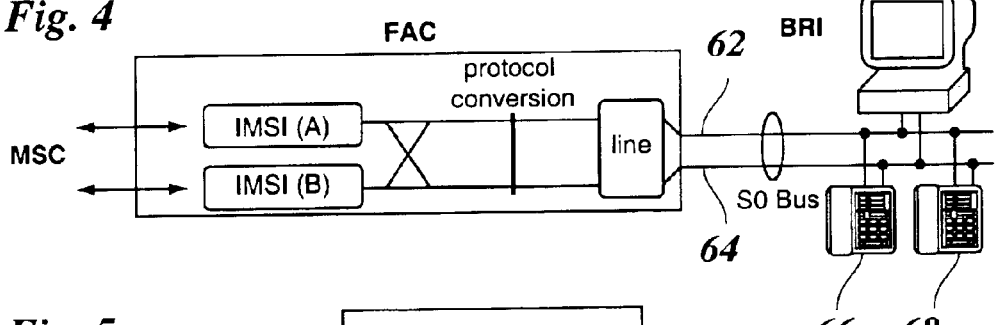
FIG. 4 is a diagram illustrating the logic connection between the mobile network and a fixed ISDN BRI access.

FIG. 2 illustrates the structure of data stored in the HLR 24 for a single subscriber who has not only a mobile terminal 22 but also a fixed access through an ISDN BRI terminal, e.g. the PBX 48 in FIG. 1. In the HLR, the subscriber identifier (IMSI) field serves as a key field of the database. As is shown in FIG. 2, the one subscriber has three files in the data base, represented by three IMSIs 56, 58, 60. IMSI 56 belongs to the mobile access, whereas IMSIs 58 and 60 belong both to the fixed access. The reason for having two IMSIs for the fixed access is that an ISDN Basic Rate Interface (BRI) comprises two traffic channels 62, 64 (FIG. 4) through which each of the terminal endpoints 66, 68, 70 can be reached. Since line provisioning is achieved under the control of the HLR, it is necessary to have also two IMSIs in order to fully exploit the capacity of the BRI access, although no fixed relation exists between the two IMSIs and the two line channels 62, 64. As is symbolized in FIG. 4, each of the two IMSIs may be linked to each of the two channels 62, 64.

As is shown in FIG. 2, subscriber data are stored for each IMSI. These subscriber data comprise a directory number (DN) 72, location information 74 and, among others, service data 76 specifying the service profile for that IMSI. In case of the IMSI 56 related to a mobile access, the directory number 72 is in the MSISDN format. However, in case of IMSIs associated with a fixed access, this is generally not the case.

The service data 76 include parameter sets 78, 80, 82 for a variety of services to which the user may have subscribed. According to the invention, a new service "Fix Lines" has been added, and parameters 84 associated with this service constitute access information which permits appropriate line provisioning for the fixed and mobile accesses of the subscriber. The parameters 84 are organized as a data structure which is shown in FIG. 3.

A first parameter "Access_Type" in this data structure specifies the access type associated with the IMSI. i.e. either "analog", "BRI primary", "BRI secondary" or "mobile". "BRI primary" and "BRI secondary" would be pertinent for the two IMSIs 58, 60 associated with the BRI access.

If the access type is "analog", the data structure may optionally include a vector which indicates the IMSI associated with the mobile terminal of the same subscriber (e.g. the IMSI 56 in FIG. 2). This information is used for doubling a call. Thus, when a call terminates to the analog access of the subscriber, the HLR knows that this subscriber has also a mobile phone, and the call will automatically be offered to the mobile phone as well.

Conversely, when the access type is "mobile", the data structure includes an entry "Default_IMSI" identifying the IMSI (or one of the IMSIs) belonging to the fixed access of the same subscriber, so that a call terminating to the mobile access can be doubled to the fixed access (even when the DNs of the fixed and mobile accesses are different).

When the access type is "BRI primary", then the Directory Number (DN) that is bound against this IMSI is either the default MSN (Multiple Subscriber Number) DN of a point to multipoint access or the DN with the extension "0" for a point to point access. Subfields are used to identify the sub-type of the BRI access and to provision data used for it. In case of a point to multipoint access there are provisioned up to three call forward DNs for the call forward types "unconditional", "busy" and "no reply", a second MSN DN with the same call forward vector and, optionally, a third to tenth DN with the same call forward vectors.

In case of a point to point access, the data specify a base DN, i.e. the directory number without direct dial in extension, the range of the direct dial-in extension, a parameter indicating whether the call shall be terminated directly if the first extension digit is "0", and up to 10 valid extensions with a DN to that all calls to this extension are offered as well. Thus, when a call is terminated to one of these extensions and the user of the extension has also a mobile phone, then the call can be doubled to the mobile phone of this user.

The access type "BRI secondary" refers to the second IMSI for a BRI access. e.g. the IMSI 60 in FIG. 2. This IMSI is used to enable two active calls on one BRI interface and to double the call offer to an "active" BRI access in order to enable Call Hold. The directory number that is bound against this IMSI (the DN entered in the field 72 in FIG. 2) is the second MSN DN of a point to multiple access or the DN with extension "1" for a point to point access. The parameters include a reference to the primary IMSI. This reference simply consists of a part (MSIN) of the IMSI, which specifies the subscriber within the operator's network, because other parts of the IMSI, i.e. the mobile country- and -operator codes are the same as those of the primary IMSI. Again, another field optionally specifies the MSI of a mobile phone to which the call has to be doubled. This mobile IMSI is specified only for the secondary IMSI of the BRI, because the primary and secondary IMSIs are always linked together. Thus, a call terminating to a fixed access can in any case be doubled to an optional mobile access of the same subscriber.

The service profiles associated with the IMSIs of the same subscriber are also linked together. This can be achieved by declaring that one IMSI. e.g. the primary IMSI for the BRI access, is the master IMSI and all other IMSIs are slaves. Then, any changes to the service profile entered for the master IMSI will automatically be taken over for the slaves, so that profile consistency is guaranteed. However, the access type information included in the "Fixed Ones" parameter 84 can be used to restrict the service profile to services possible with analog devices, if the access type is "analog". Corresponding restrictions can also be made for the other access types.

Figure 5:
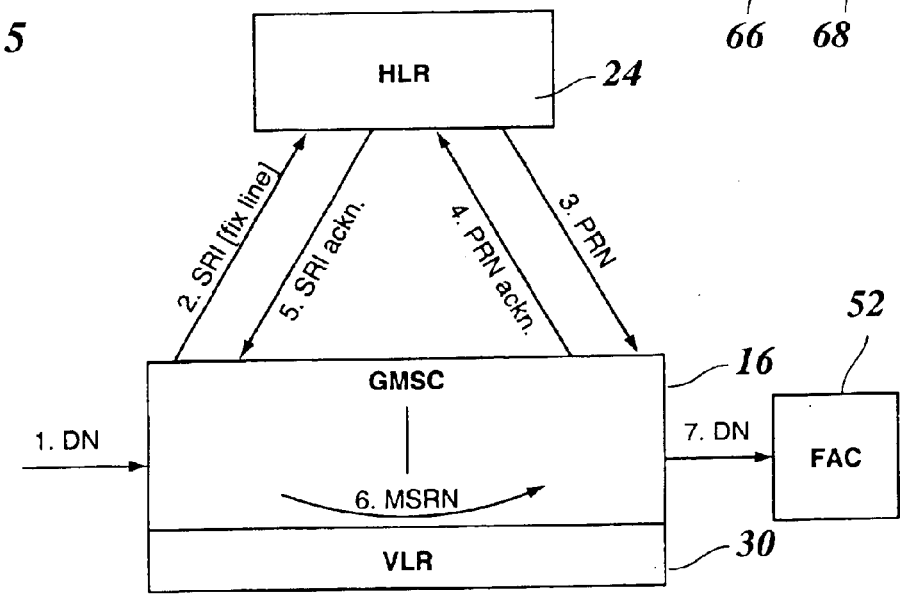
FIG. 5 is a diagram for illustrating call processing in the network shown in FIG. 1.

FIG. 5 illustrates the main call handling steps for establishing a call connection.

The call may originate from a mobile terminal 22 of the network 10, from the PSTN 32 or from a fixed terminal connected to the wireline network 40.

If the call terminates to a the mobile access 22, then the call will first arrive at one of the MSCs or the GMSC (originating MSC) and will then be routed to another MSC (terminating MSC) that it visited by the called device. For illustrative purposes. GMSC 16 in FIG. 5 has been split into two parts, with the part on the left side playing the roll of the originating MSC and the part on the right side playing the roll of the terminating MSC. In a first step (1.), a directory number DN is received at the originating side of the GMSC. If this number is of the MSISDN type, which means that it points to a mobile terminal, a "Send Routing Information" query (SRI) is sent to the HLR 24 in a second step (2.). HLR 24 identifies the IMSI of the called terminal and identifies the terminating MSC on the basis of the stored location information. Then, in step 3, a query "Provide Roaming Number" (PRN) is sent to the terminating MSC, and this MSC returns, in step 4, a roaming number under which the called terminal can be reached. This roaming number is then returned to the originating MSC in an SRI acknowledge message (step 5). Then, in step 6, the originating MSC sends the Mobile Subscriber Roaming Number (MSRN) to the terminating MSC, where the connection with the called mobile terminal is built up. This last step is not shown in FIG. 5, because FIG. 5 illustrates the case that the call is terminating to a fixed access.

When the called DN is not of the MSISDN type and, instead, specifies a fixed terminal, the call will always arrive at the Gateway MSC 16 associated with the FAC 52. With a message "Insert Subscriber Data" (MAP/D standard), the Visitor Location Register CVLR) 30 associated with this GMSC automatically gets from the HLR 24 the "Fix Lines" service data 84 for all the fixed terminals connected to the wireline network 40. From these data, the VLR 30 extracts all BRI point to multipoint MSNs, all BRI point to point base DNs and all analog line DNs and sets up a DN table in which the extracted DNs are mapped to the (primary) MSINs (last parts of the IMSIs) of the access. The validity of the DN received in step 1 can then be checked against this table.

If the call originates from an analog terminal. e.g. the analog telephone 32 in FIG. 1, overlap dialing is used, and the last digits of the DN drop in one by one at the GMSC 16. The GMSC queries the VLR as to the validity of the incoming DN. The VLR returns "yes" if the sequence of incoming digits is identical to one of the DNs stored in the table. It returns "may be, if the incoming digits are consistent with one of the stored DNs but the DN is not yet complete, and it returns "no" if the sequence of digits is not consistent with any of the stored DNs. In the latter case, the call is released.

If the DN is valid, the VLR can determine the IMSI against which the DN is bound. If the DN is one of a primary BRI access, the VLR can also identify the IMSI for the secondary access by referring to the "Fix Lines" profile of the primary access. This profile includes the DN against which the secondary IMSI is bound (either the second MSN or the base DN with extension "1"). It should be noted however that the VLR 30 could not retrieve the service profile of a linked mobile access (unless the mobile phone happens to visit the GMSC 16).

The VLR 30 returns the access type, the status of the IMSI(s) and, if necessary, additional access specific information for the called DN.

The SRI query now includes a new parameter ("fix line") which forwards to the HLR the information necessary for deciding whether a call needs to be doubled.

The details of call processing depend on the type of the terminating access.

At first, the case will be described that a call is terminating to an analog access, e.g. to the analog telephone 42. In this case, there is no additional access specific information. As soon as the VLR query returns with a valid DN, the GMSC 16 sends the SRI query with the "fix line" parameter set to the HLR.

The HLR detects that the "Fix Lines" service is provisioned for the IMSI that belongs to the DN used for the query. If no mobile terminal is linked to the "Fix Lines" profile, the analog line is handled like a mobile line. Thus, the call connection is built up following the steps 3, 4, 5 and 6 in FIG. 5, and in step 7 the MSRN is converted into the DN of the terminating access and is sent to the FAC 52.

If, however, the "Fix Lines" profile for the analog access includes a reference to a mobile access, the call has to be offered to the mobile access as well. To this end, the HLR returns not only the call DN but also the MSISDN of the mobile terminal on the SRI query with the "fix line" parameter set. The MSC then issues two new SRI queries for the two DNs, each without the "fix line" parameter set. The HLR returns two roaming numbers that are used by the GMSC to build the two terminating legs of the call, with the result of simultaneous ringing of the analog line and the mobile phone. The call association is done in the GMSC 16. As soon as one call leg connects, the other one is released by the GMSC.

Next, a call terminating to a BRI point to point access will be described.

Here, the VLR query (subsequent to step 1) returns: the access type (BRI point to point), the base DN of the access, the number of extension digits and a parameter indicating whether or not the call has to be terminated directly if the first extension digit is "0".

The GMSC then collects the additional digits needed for completing the extension and issues an SRI query with a DN formed by the base DN+"0" and with the "fix line" parameter set. In this case, the "fix line" parameter includes the dialed extension and the state of the two IMSIs.

If no mobile is linked to the extension. i.e. if the user of the call extension does not have subscribed for a mobile telephone in the network 10, the call is handled essentially like a normal mobile call. The HLR chooses the first idle IMSI and uses that one for the PRN query in step 3.

If no IMSI is idle, the GMSC 16 gets an indication about this from the HLR 24 and releases the call to the originator with the cause "user busy".

If there is a mobile linked to the extension and both fix line IMSIs are busy, the call is only routed to the mobile. If the mobile's MSISDN is controlled by the HLR 24, the HLR issues the PRN query directly. Otherwise, it returns the MSISDN without the "fix line" parameter set, and the call will be routed to a mobile in another network.

If at least one of the fix line IMSIs is free, the HLR returns both the DN stored against the IMSI and the MSISDN of the mobile, with the "fix line" parameter set. Then, the call offer is doubled in the same way as described above for analog lines with mobiles.

Next, the case of a call terminating to a BRI point to multipoint access will be described.

Here, the VLR query returns: the access type (BRI point to multipoint), the default DN of the access i.e. the DN to be used to query the HLR, and an internal index (0 . . . 9) of the called DN (MSN) in the subscriber's DN table.

From there, the GMSC gets the linked IMSI and the state of the two IMSIs and issues the SRI query with the default DN and with the state of the IMSIs and the index of the real called DN in the "fix line" parameter.

The result depends on various circumstances, the most important of which are whether or not a mobile is linked to the "Fix Lines" profile, Call Waiting, Call Hold or Call Forwarding are provisioned against the profile, and the state of the fix line IMSIs.

The easiest case is that Call Forward Unconditional is set for the MSN represented by the index. In that case, the call forward number is returned in the same way as a call forward number would be returned for a normal mobile IMSI.

Another possibility is that all IMSIs (the two fix line IMSIs and the optional mobile IMSI) are busy and Call Forward Busy is set for the real called MSN. The call is then processed in the same way as described above for "Call Forward Unconditlonal".

Another possible case is that there is no mobile component and neither Call Forward Unconditional nor Call Forward Busy is set for the called MSN.

If both IMSIs are idle, the HLR 24 uses the primary IMSI for the PRN query, and the call is terminated like a mobile call, with the only difference that, when the call is forwarded to the FAC in step 7, the real called MSN is derived from the DN index and is inserted as the called DN.

In the same scenario with a mobile component, the HLR would return the default DN and the mobile's MSISDN to the GMSC 16, which would in turn issue additional SRI queries for those DNs without the "fix line" parameter set. Thus, the call offer would be doubled like in the analog case. Again, the real called DN (MSN) would be used for the called DN in step 7.

If at least one of the fix line IMSIs is busy, the behavior varies depending on the provisioning of Call Hold and Call Waiting.

If all IMSIs are busy and Call Waiting is not provisioned, the HLR indicates that to the GMSC, and the call is released with the cause "user busy".

If call waiting is not provisioned and at least one IMSI is idle, this one IMSI gets the call offered. If only one fix line IMSI is busy and a mobile is in the profile, the call is offered to both the mobile and the idle IMSI.

Next, cases will be discussed in which Call Waiting is provisioned but Call Hold is not.

If there is no mobile, and only one IMSI is idle, the call is offered only on the idle IMSI. If both IMSIs are busy, the call is offered only on the primary IMSI (with Call Waiting indication). If there is already a second call offered on this IMSI, the call is released immediately.

If a mobile is in the profile, the call is offered to the mobile as well. If both fix line IMSIs are busy and a third call is offered for the primary IMSI, a next call is offered only to the mobile, or it is released, if there is already a call waiting on that mobile.

The most complex case is the one, where Call Waiting and Call Hold are provisioned and at least one of the two fix line IMSIs are busy. In this case, a new incoming call has to be offered to both fix line IMSIs to avoid blocked B-channels and unretrievable calls.

The FAC 52 has to associate the two call offers and generate one offer to the terminal side. Internally, the FAC has to have a temporary association between Terminal Endpoint Identifier GEI) and IMSI for active calls. As soon as the terminal side connects, the FAC has to pass the Connect only to the correct IMSI. The other call leg will then be released automatically by the GMSC.

An example for this last scenario is illustrated in Table I which shows the internal IMSI/TEI linkage.

In line 4, terminal 66 goes on hold thereby reserves one of the B-channels.

Terminal 66 then accepts the second call (c2) on the B-channel II. This frees up the reserved B-channel I. The Connect towards the GMSC is sent for IMSI A, and IMSI B is released by the GMSC (line 5).

In line 6, a third call (O3) is offered on both IMSIs A and B. IMSI A gets this call offered because GSM specifies to offer a third call. On the terminal side, the call is offered on the B-channel 1 (o3).

In line 7, terminal 68 accepts the call.

Figure 6:
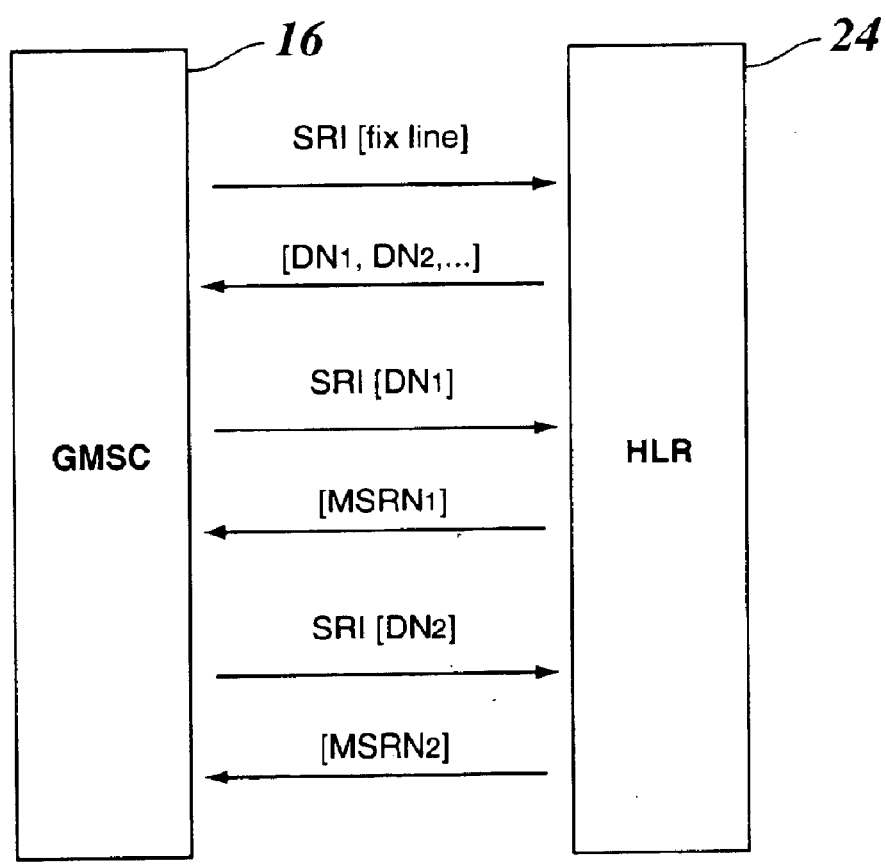
FIG. 6 illustrates a signal flow that is used for call multiplication.

As will be understood from the above description, call doubling is required on several occasions when a call terminates to a fixed access. The call doubling procedure is implemented in this embodiment by adding the parameter "fix line" to the SRI query and by querying the HLR 24 repeatedly, first with the "fix line" parameter set and then for each of the returned DNs without the "fix line" parameter set, as is illustrated in FIG. 6.

This information flow is possible without changes to the trunking protocols used between the originating MSC and the terminating MSC, because the MSC controlling the fixed lines is a gateway MSC.

Under many national laws, legal Call Interception must be provided for. In this context, any MSN of a BRI point to multipoint access may be a legal target. In the shown embodiment, legal fixed line targets can be marked in VLR 30, and the GMSC 16 may start the Call Monitoring and Call Interception procedures. Likewise, the system may easily be arranged for delivery of the calling number and/or the connected number.

TABLE 1

| | IMSI A | IMSI B | BC I | BC II | Terminal 66 | Terminal 68 | Terminal 70 |
|---|---|---|---|---|---|---|---|
| 1 offering for call 1 | O1 | | o1 | | o1 | o1 | o1 |
| 2 call 1 active | C1 | | c1 | | c1 | | |
| 3 (call 1 active) | C1 | | c1 | | c1 | | |
| offering for call 2 | O2[a] | O2 | | o2 | o2 | o2 | o2 |
| 4 (offering for call 2) | O2 | O2 | | o2 | o2 | o2 | o2 |
| call 1 goes on HOLD | H1 | | one BC is reserved | | h1 | | |
| 5 (call 1 on HOLD) | H1 | | free | reserved | h1 | | |
| call 2 active | C2 | | | c2 (used) | c2 | | |
| 6 (call 1 on HOLD) | H1 | | | reserved | h1 | | |
| (call 2 active) | C2 | | | c2 | c2 | | |
| offering for call 3 | O3 | O3 | o3 | | o3 | o3 | o3[b] |
| 7 (call 1 on HOLD) | H1 | | | reserved | h1 | | |
| (call 2 active) | C2 | | | c2 | c2 | | |
| call 3 active | | C3 | c3 | | | c3 | |

[a]Offered with Call Waiting Indication
[b]Offered without B-channel and Call Waiting Indication IMSI A and IMSI B are linked against the same line in the FAC. In line 1 of the table, the GMSC sends a first setup message to the idle access (O1) The FAC sends a Q931 Setup (o1) to the BRP loop which has the terminals 66, 68 and 70 and declares B-channel I (channel 62) to be used. The call (C1) is linked to IMSI A.

Terminal 66 accepts the call (line 2).

In line 3, a second call arrives. This call is now offered to both IMSIs. The resulting Q931 Setup is offered on the free B-channel II (channel 64 in FIG. 4). The call is linked to both IMSIs.

If a call originates from an analog telephone 42 in the wireline network 40, the FAC 52 has to collect the digits in order to forward the DN en-bloc to the GMSC 16.

For a BRI access, the GMSC 16 is in charge for screening calling- and connected numbers. To do the screening, the GMSC normalizes the number (to the format of a national number) and validates it against the DN table stored in the VLR 30. If the number is a valid MSN of the access that originated the call, the MSN as stored in the VLR DN table is used as calling- or connected number. Otherwise, the default DN of the access is used, and the screening indicator is set to "network provided".

Although a preferred embodiment of the invention has been described, a person skilled in the art may conceive of various modifications which are understood to be encompassed by the present invention as specified in the appended claims.

What is claimed is:

1. A method for integrating fixed terminals in a mobile telecommunications network capable of handling calls to and from registered subscribers, comprising the steps of:
   connecting the fixed terminals through fixed lines to an interface unit for the mobile network;
   providing, in the mobile telecommunications network, a register for storing, for each subscriber, subscriber information by which the subscriber is addressable;
   storing, as part of the subscriber information, access information specifying one or more predefined access types, that are available for that subscriber, and specifying whether or not the subscriber has multiple access to the network; and
   controlling the call handling within the mobile network and the call handling of calls involving at least one of the fixed terminals on the basis of the stored access information.

2. The method according to claim 1, wherein the register is in the form of a database in which each access is represented by an identifier and the associated subscriber information, and the access type information includes a reference to another identifier which represents another access of the same subscriber.

3. The method according to claim 2, wherein the subscriber information for one of the identifiers belonging to the same subscriber includes service data specifying a service profile to which the subscriber is entitled, and it is specified that all the other accesses of this subscriber are entitled to the same service profile, as far as the services included in the profile are compatible with the access type.

4. The method according to claim 2, wherein one of the predefined access types is an ISDN BRI type access, and this access is defined as a multiple access and is represented in the register by two identifiers.

5. The method according to claim 1, wherein call handling comprises the steps of:
   (a) checking, by reference to the access information, whether the access to which the call is terminated is one of a multiplicity of accesses linked together as a multiple access,
   (b) retrieving address information for all the linked accesses from the register, and
   (c) offering the call to each one of the linked accesses.

6. The method according to claim 5, wherein the subscriber information associated with identifiers referring to fixed terminals is copied from the central register into a local register, and step (a) is performed by reference to the local register.

7. The method according to claim 6, wherein the step (b) comprises the sub-steps of
   b1) obtaining from the local register an access indicator associated with the address to which the call was directed,
   b2) sending to the central register a query including said access indicator and a parameter indicating that there are other accesses linked to that access, and
   b3) retrieving the address information associated with the linked accesses from the central register.

8. The method according to claim 1, wherein one of the predefined access types is a point to point access having a plurality of extensions, and the access type information includes references to mobile accesses that are each linked to one of the extensions.

9. The method according to claim 1, wherein one of the predefined access types is a point to multipoint access for which a plurality of Multiple Subscriber Numbers are provided, and wherein the access type information includes Call Forward specifications for at least one of the Multiple Subscriber Numbers.

10. The method according to claim 1, wherein the step of storing the access information is followed by a step of extracting from the subscriber information a table of directory numbers under which the fixed terminals can be addressed, and wherein the call handling step comprises a step of collecting the digits of a dialed directory number and checking the sequence of digits for validity by reference to the table of directory numbers.

11. A telecommunications network including a mobile network and fixed lines connecting fixed terminals to the mobile network through an interface unit,
   the mobile network comprising a register storing subscriber information for each subscriber to the network,
   wherein the subscriber information includes access information specifying one or more predefined access types, that are available for that subscriber,
   and specifying whether or not the subscriber has multiple access to the network;
   the telecommunications network having means for controlling the call handling within the mobile network and the call handling of calls involving at least one of the fixed terminals on the basis of the stored access information.

12. The network according to claim 11, wherein the mobile network is a switched node type network and the register is a Home Location Register.

13. The network according to claim 12, wherein the interface unit is connected to one of the nodes of the mobile network and emulates, towards the side of the node, a subsystem for wireless communication with mobile terminals.

14. The network according to claim 13, wherein the mobile network is a GSM type network.

15. The network according to claim 14, wherein the node to which the interface unit is connected is a Gateway MSC.

16. The network according to claim 15, wherein a copy of the access information is also stored in a Visitor Location Register associated with the Gateway MSC.

17. The network according to claim 16, wherein at least one of the fixed terminals is of a type having two ISDN BRI channels, this access is represented in the Home Location Register by two linked subscriber identifiers, and the interface unit is arranged to dynamically change the association between the two identifiers and the two BRI-channels depending on the idle and busy states of the lines which connect the interface unit to the Gateway MSC and to the fixed terminal.

18. The network according to claim 11, wherein at least one of the fixed terminals is of a type having two ISDN BRI channels, this access is represented in the register by two linked subscriber identifiers, and the interface unit is arranged to dynamically change the association between the two identifiers and the two BRI-channels depending on the idle and busy states of the lines which connect the interface unit to the mobile network and to the fixed terminal.

* * * * *